United States Patent
Fox et al.

(10) Patent No.: US 11,761,301 B2
(45) Date of Patent: Sep. 19, 2023

(54) PISTON LOAD RING SEAL CONFIGURATIONS

(71) Applicant: Schlumberger Technology Corporation, Sugar Land, TX (US)

(72) Inventors: Jessica Fox, Middleton, WI (US); Richard Caminari, The Woodlands, TX (US); Steven Hill, Houston, TX (US); Jason Henry, Houston, TX (US); Emilie Garnier, Houston, TX (US); Ignacio Marquez, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 380 days.

(21) Appl. No.: 17/279,616

(22) PCT Filed: Sep. 23, 2019

(86) PCT No.: PCT/US2019/052387
§ 371 (c)(1),
(2) Date: Mar. 25, 2021

(87) PCT Pub. No.: WO2020/068642
PCT Pub. Date: Apr. 2, 2020

(65) Prior Publication Data
US 2021/0340837 A1    Nov. 4, 2021

Related U.S. Application Data

(60) Provisional application No. 62/735,998, filed on Sep. 25, 2018.

(51) Int. Cl.
*E21B 34/14* (2006.01)
*E21B 34/08* (2006.01)
(Continued)

(52) U.S. Cl.
CPC .......... *E21B 34/14* (2013.01); *E21B 33/1208* (2013.01); *E21B 34/08* (2013.01);
(Continued)

(58) Field of Classification Search
CPC .......... F16K 41/08; F16K 41/04; E21B 34/14; E21B 33/1208; E21B 33/1216;
(Continued)

(56) References Cited

U.S. PATENT DOCUMENTS 2,303,511 A     12/1942 Tawney
3,477,731 A  *  11/1969 Workman ............ F16J 15/3216
                                                    277/560
(Continued)

FOREIGN PATENT DOCUMENTS

EP        1087157 A2    3/2001
KR      870001187 A     3/1987
(Continued)

OTHER PUBLICATIONS

International Search Report and Written Opinion issued in the PCT Application PCT/US2021/029785, dated Jul. 27, 2021 (10 pages).
(Continued)

*Primary Examiner* — David Colon-Morales
(74) *Attorney, Agent, or Firm* — Michael Wills, III

(57) ABSTRACT

A technique facilitates improved sealing with respect to safety valve pistons so as to improve reliable safety valve operation. According to an embodiment, a safety valve piston seal assembly is positioned about a safety valve piston and comprises components which divert a load path to the safety valve piston rather than to susceptible components of the seal assembly. For example, the seal assembly may comprise a load ring and spacers to energize a V-ring when pressure is applied to a metal spring energized (MSE) seal. However, the components are arranged so the load path
(Continued)

is diverted to the safety valve piston when pressure occurs behind the V-ring instead of allowing the loading to act against the MSE seal.

18 Claims, 6 Drawing Sheets

(51) Int. Cl.
| | |
|---|---|
| *E21B 33/12* | (2006.01) |
| *F16J 15/16* | (2006.01) |
| *F16J 15/3236* | (2016.01) |
| *F16K 41/08* | (2006.01) |
| *F16J 15/00* | (2006.01) |

(52) U.S. Cl.
CPC ............ *F16K 41/08* (2013.01); *F16J 15/002* (2013.01); *F16J 15/166* (2013.01); *F16J 15/3236* (2013.01)

(58) Field of Classification Search
CPC .... E21B 34/08; E21B 33/1285; E21B 33/128; F16J 15/002; F16J 15/166; F16J 15/3236
See application file for complete search history.

(56) References Cited

U.S. PATENT DOCUMENTS

| | | | | |
|---|---|---|---|---|
| 4,169,605 A * | 10/1979 | Nishimoto | ............. | F16J 15/166 277/584 |
| 4,234,197 A * | 11/1980 | Amancharla | .......... | F16J 15/166 277/540 |
| 4,451,047 A | 5/1984 | Herd et al. | | |
| 4,457,379 A * | 7/1984 | McStravick | ............ | E21B 34/14 166/373 |
| 4,508,356 A * | 4/1985 | Janian | ..................... | F16J 15/328 267/1.5 |
| 4,527,806 A | 7/1985 | Ungchusri et al. | | |
| 4,576,385 A * | 3/1986 | Ungchusri | ............. | F16J 15/184 277/540 |
| 4,588,030 A * | 5/1986 | Blizzard | ............. | E21B 33/1292 277/342 |
| 4,592,558 A * | 6/1986 | Hopkins | .............. | F16J 15/3212 277/572 |
| 4,618,154 A * | 10/1986 | Freudenthal | ......... | F16J 15/3236 277/556 |
| 4,630,636 A * | 12/1986 | Cutcher | ................... | F16K 41/04 137/315.35 |
| 4,706,970 A * | 11/1987 | Ramirez | ............. | F16J 15/3236 277/556 |
| 4,811,959 A * | 3/1989 | Bullard | ............... | E21B 33/1208 277/342 |
| 5,095,994 A * | 3/1992 | Dollison | ................. | E21B 34/08 166/323 |
| 5,230,498 A * | 7/1993 | Wood | ..................... | F16J 15/186 137/553 |
| 5,246,236 A * | 9/1993 | Szarka | ................. | F16J 15/0887 277/626 |
| 5,265,890 A | 11/1993 | Balsells | | |
| 5,799,953 A * | 9/1998 | Henderson | ........... | F16J 15/3236 277/567 |
| 5,810,083 A * | 9/1998 | Kilgore | ................... | E21B 34/10 166/321 |
| 5,879,010 A * | 3/1999 | Nilkanth | ............. | E21B 33/1216 277/584 |
| 6,203,020 B1 * | 3/2001 | Mireles, Jr. | ......... | E21B 33/1216 277/339 |
| 6,290,235 B1 * | 9/2001 | Albertson | ............ | F16J 15/3236 277/552 |
| 6,406,028 B1 * | 6/2002 | Kannan | ............... | E21B 33/1208 277/342 |
| 6,454,273 B1 * | 9/2002 | Kashima | ................ | F16J 15/166 277/928 |
| 7,401,788 B2 * | 7/2008 | Williams | ............... | F16J 15/181 277/342 |
| 7,647,975 B2 * | 1/2010 | Messick | ................ | E21B 43/123 166/372 |
| 8,215,646 B2 * | 7/2012 | Castleman | ........... | F16J 15/3212 277/584 |
| 8,348,639 B2 * | 1/2013 | Okada | .................. | F16J 15/3204 417/423.11 |
| 8,714,560 B2 * | 5/2014 | Faas | ..................... | F16J 15/3236 277/584 |
| 8,794,638 B2 * | 8/2014 | Tuckness | ................. | F16J 15/26 277/584 |
| 9,163,729 B2 * | 10/2015 | Varghese | ............. | F16J 15/3236 |
| 9,194,511 B2 * | 11/2015 | Newlands | ............... | F16K 41/04 |
| 9,512,924 B2 * | 12/2016 | Uesugi | .................... | F16J 15/166 |
| 10,119,357 B2 * | 11/2018 | Roselier | ............. | E21B 33/1216 |
| 10,125,872 B2 * | 11/2018 | Binder | ................... | F16J 15/322 |
| 10,415,719 B2 * | 9/2019 | Leboeuf | ................. | F16J 15/18 |
| 10,443,352 B2 * | 10/2019 | Cleven | .................... | E21B 34/08 |
| 2002/0153664 A1 * | 10/2002 | Schroeder | ................ | F16J 15/56 277/551 |
| 2003/0222410 A1 | 12/2003 | Williams et al. | | |
| 2004/0145120 A1 | 7/2004 | Faas et al. | | |
| 2009/0152817 A1 | 6/2009 | Du | | |
| 2011/0140369 A1 | 6/2011 | Lenhert | | |
| 2013/0161553 A1 | 6/2013 | Hunter | | |
| 2014/0084199 A1 | 3/2014 | Newlands et al. | | |
| 2014/0183392 A1 | 7/2014 | Hunter et al. | | |
| 2014/0361494 A1 | 12/2014 | Lenhert | | |

FOREIGN PATENT DOCUMENTS

| | | |
|---|---|---|
| KR | 100260308 B1 | 7/2000 |
| WO | 2020068642 A1 | 4/2020 |
| WO | 2021222496 A1 | 11/2021 |

OTHER PUBLICATIONS

International Search Report and Written Opinion issued in the PCT Application PCT/US2019/052387, dated Jan. 15, 2020 (11 pages).
International Preliminary Report on Patentability of PCT Application No. PCT/US2019/052387 dated Mar. 23, 2021, 7 pages.

* cited by examiner

PISTON LOAD RING SEAL CONFIGURATIONS

CROSS-REFERENCE TO RELATED APPLICATION

The present document is based on and claims priority to U.S. Provisional Application Ser. No. 62/735,998, filed Sep. 25, 2018, which is incorporated herein by reference in its entirety.

BACKGROUND

In many hydrocarbon well applications, various types of tubing strings may be deployed downhole in a borehole. For example, tubing strings may comprise completion equipment deployed in a wellbore to facilitate production of hydrocarbon fluids, e.g. oil and/or gas. The tubing string may include a safety valve which is actuated to restrict flow up through the tubing string upon the occurrence of various conditions. The safety valve often is actuated to a desired operational position via a piston which is shifted via hydraulic fluid supplied under pressure. The piston is combined with at least one seal assembly having components arranged to establish a seal between the piston and a surrounding surface. However, the seal assembly can be exposed to pressures, e.g. back pressures, which can lead to seal extrusion and pressure leaks behind the seal assemblies.

SUMMARY

In general, a methodology and system are provided which facilitate improved sealing with respect to safety valve pistons so as to improve reliable safety valve operation. According to an embodiment, a safety valve piston seal assembly is positioned about a safety valve piston and comprises components which divert a load path to the safety valve piston rather than to susceptible components of the seal assembly. For example, the seal assembly may comprise a load ring and spacers to energize a V-ring when pressure is applied to a metal spring energized (MSE) seal. However, the components are arranged so the load path is diverted to the safety valve piston, instead of allowing the loading to act against the MSE seal, when pressure occurs behind the V-ring.

A system to facilitate operation of a safety valve according to one or more embodiments of the present disclosure includes a safety valve piston, and a safety valve piston seal assembly disposed about the safety valve piston. In one or more embodiments of the present disclosure, the safety valve piston seal assembly includes an MSE seal, an MSE backup ring adjacent the MSE seal, at least one V-ring, a V-ring backup ring engaging the at least one V-ring, an adapter engaging the at least one V-ring on an opposite side from the V-ring backup ring, and a load transfer assembly disposed between the adapter and the MSE backup ring to reduce detrimental loading, which would otherwise occur along a load path through the MSE seal, by directing loading to the safety valve piston.

A system according to one or more embodiments of the present disclosure includes an actuator and a seal assembly disposed about the actuator. In one or more embodiments of the present disclosure, the seal assembly includes an MSE seal, at least one sealing element, an adapter engaging the at least one sealing element on one side of the at least one sealing element, and a plurality of load rings dividing the seal assembly into a plurality of zones that separate the MSE seal from the at least one sealing element, the at least one sealing element configured to hold pressure and transfer a load to at least one load ring of the plurality of load rings, the at least one load ring of the plurality of load rings being configured to transfer the load to the actuator without loading the MSE seal.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a methodology and system which facilitate improved sealing with respect to safety valve pistons so as to improve reliable safety valve operation. Depending on the application, the safety valve piston may have various sizes and configurations and may be operatively coupled with various types of safety valves. Examples of safety valves include flapper valves, ball valves, and other suitable valve configurations which can be utilized as safety valves along a tubing string.

According to an embodiment, a safety valve piston seal assembly is positioned about a safety valve piston and comprises components which divert a load path to the safety valve piston rather than to susceptible components of the seal assembly. For example, the seal assembly may comprise a load ring and spacers to energize a V-ring when pressure is applied to a metal spring energized (MSE) seal. However, the components are arranged so the load path is diverted to the safety valve piston when pressure occurs behind the V-ring (instead of allowing the loading to act against the MSE seal).

The arrangement effectively creates a more reliable seal assembly. As described in greater detail below, embodiments of the seal assembly allow the MSE seal to load the V-ring across a load ring. However, the load ring prevents the V-ring from loading the MSE seal in a reverse direction due to, for example, back pressure.

Figure 1:
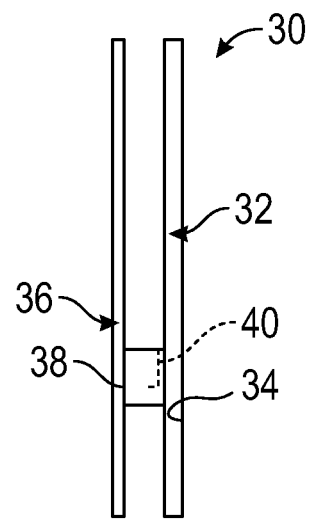
FIG. 1 is a schematic illustration of a tubing string comprising a safety valve deployed in a borehole, according to an embodiment of the disclosure.

Referring generally to FIG. 1, a schematic illustration shows an example of a well system 30 having a tubing string 32 deployed in a borehole 34, e.g. a wellbore. The tubing string 32 may comprise a downhole completion 36 combined with a safety valve 38 which can be actuated to different operational positions via a safety valve piston 40. The safety valve 38 may be used with many types of downhole completions 36 and in various hydrocarbon production operations and other types of well related operations.

Figure 2:
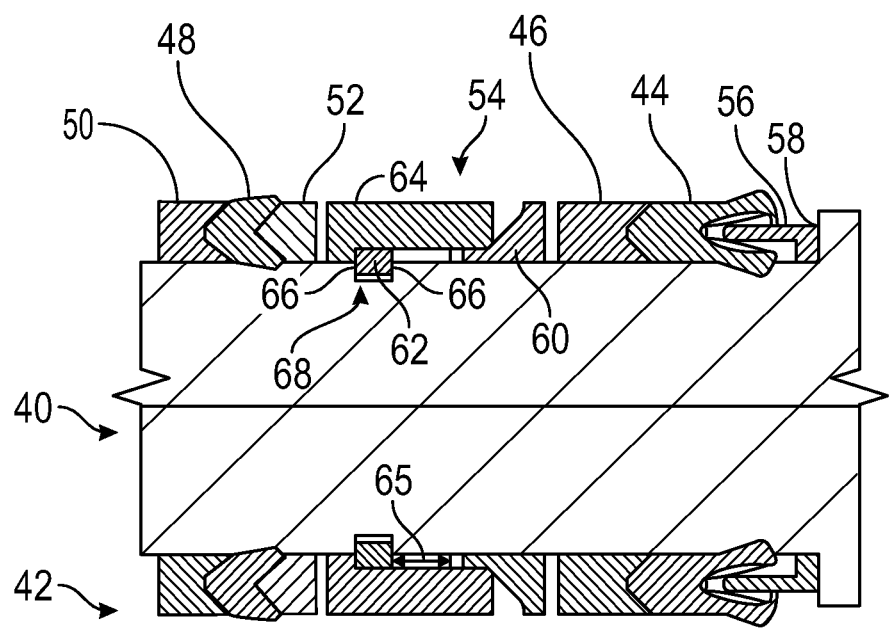
FIG. 2 is a cross-sectional illustration of an example of a safety valve piston seal assembly mounted about a safety valve piston, according to an embodiment of the disclosure.

Referring generally to FIG. 2, an example of safety valve piston 40 is illustrated as combined with a safety valve piston seal assembly 42 which is disposed about the safety valve piston 40. In this embodiment, the safety valve piston seal assembly 42 comprises a metal spring energized (MSE) seal 44 and an MSE backup ring 46 disposed adjacent the MSE seal 44. The seal assembly 42 further comprises a V-ring 48 and a V-ring backup ring 50 engaging one side of the V-ring 48. An adapter 52 also is illustrated as disposed adjacent the V-ring 48 but on an opposite side of the V-ring 48 relative to the backup ring 50. The V-ring 48 may be an elastomeric seal or a non-elastomeric seal according to one or more embodiments of the present disclosure. Moreover, the V-ring 48 may be replaced with a seal having a different shape, such as a "T" seal, for example, or another pressure-energized elastomeric seal without departing from the scope of the present disclosure.

Additionally, the seal assembly 42 comprises a load transfer assembly 54 disposed between the adapter 52 and the MSE backup ring 46. The load transfer assembly 54 is constructed to reduce detrimental loading which could otherwise occur along a load path through the MSE seal 44. Instead, this potential detrimental loading is directed to the safety valve piston 40 so as to protect the MSE seal 44. It should be noted, the seal assembly 42 also may comprise a hat ring 56 disposed between the MSE seal 44 and an abutment 58 of the safety valve piston 40 as illustrated.

According to an embodiment, the load transfer assembly 54 comprises an MSE spacer 60, a load ring 62, and a V-ring spacer 64. In the illustrated example, the MSE spacer 60 is disposed between the V-ring spacer 64 and the MSE backup ring 46. The V-ring spacer 64 is captured between the load ring 62 and the adapter 52 but it is able to shift axially over a range of motion illustrated by arrow 65. Additionally, the V-ring spacer 64 may be constructed with a retaining ring portion disposed about the load ring 62 for retaining the load ring 62 at a desired position along the safety valve piston 40. For example, the load ring 62 may be positioned to engage a shoulder or shoulders 66 of the safety valve piston 40. In the example illustrated, the shoulders 66 are positioned to form part of a groove 68 disposed circumferentially about safety valve piston 40 and sized to receive the load ring 62 partially therein.

When pressure is applied to the MSE seal 44, the MSE seal 44 loads on the MSE backup ring 46 which, in turn, transfers the load to the MSE spacer 60. The MSE spacer 60 transfers the load to the V-ring spacer 64 which transfers the load to the adapter 52 and then to the V-ring 48 itself, as illustrated by arrow 70 in FIG. 3. The loading is further transferred to the V-ring backup ring 50 and to one of the shoulders 66 of safety valve piston 40.

Figure 4:
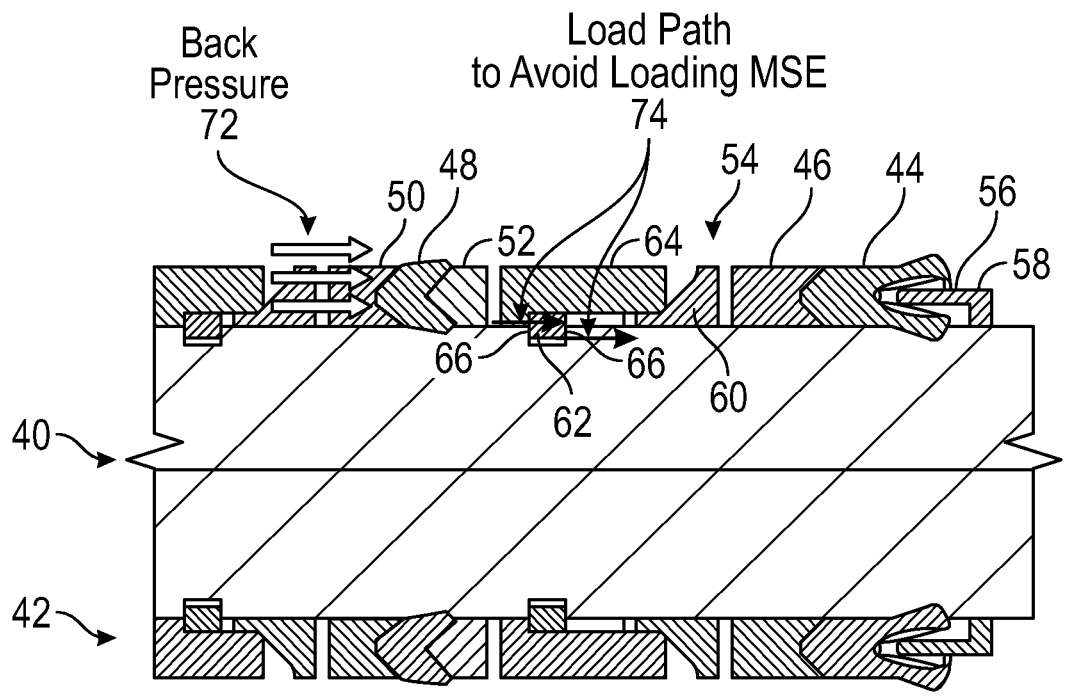
FIG. 4 is a cross-sectional illustration similar to that of FIG. 2 but in a different operational position, according to an embodiment of the disclosure.

However, when back pressure is present as indicated by arrows 72 in FIG. 4, the pressure trapped by the V-ring 48 loads on the adapter 52 and then onto the V-ring spacer 64. The V-ring spacer 64 transfers the load to the load ring 62 and then to safety valve piston 40 via the corresponding shoulder 66, as represented by arrows 74. By directing the load path to the safety valve piston 40 in this manner, the potential load path through the MSE seal 44 is reduced or eliminated.

Figure 3:
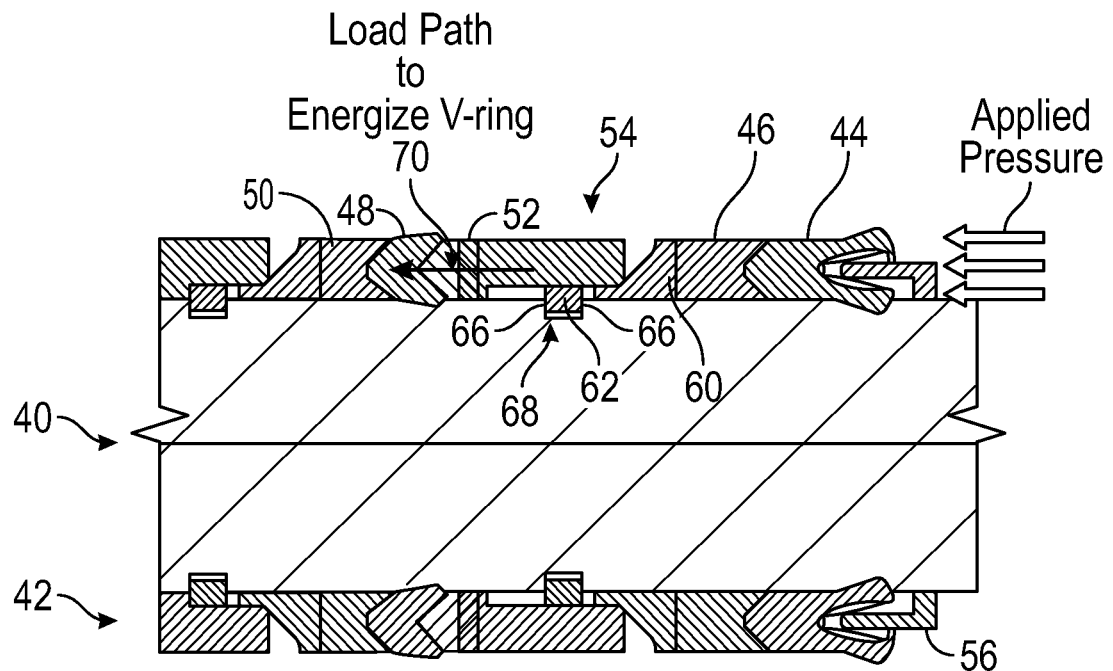
FIG. 3 is a cross-sectional illustration similar to that of FIG. 2 but in a different operational position, according to an embodiment of the disclosure.

According to one or more embodiments of the present disclosure, the load transfer assembly 54 may include a gap between the MSE spacer 60 and the load ring 62, such as that shown in FIG. 3 for example, which allows movement of the load ring 62 with respect to the MSE spacer 60. In other embodiments of the present disclosure, the gap between the MSE spacer 60 and the load ring 62 may be removed, thereby restricting movement of the load ring 62 with respect to the MSE spacer 60. This no-gap configuration of the load transfer assembly 54 may impart additional loading to the safety valve piston 40 via the load ring 62, which affords additional protection of the MSE seal 44.

Figure 5:
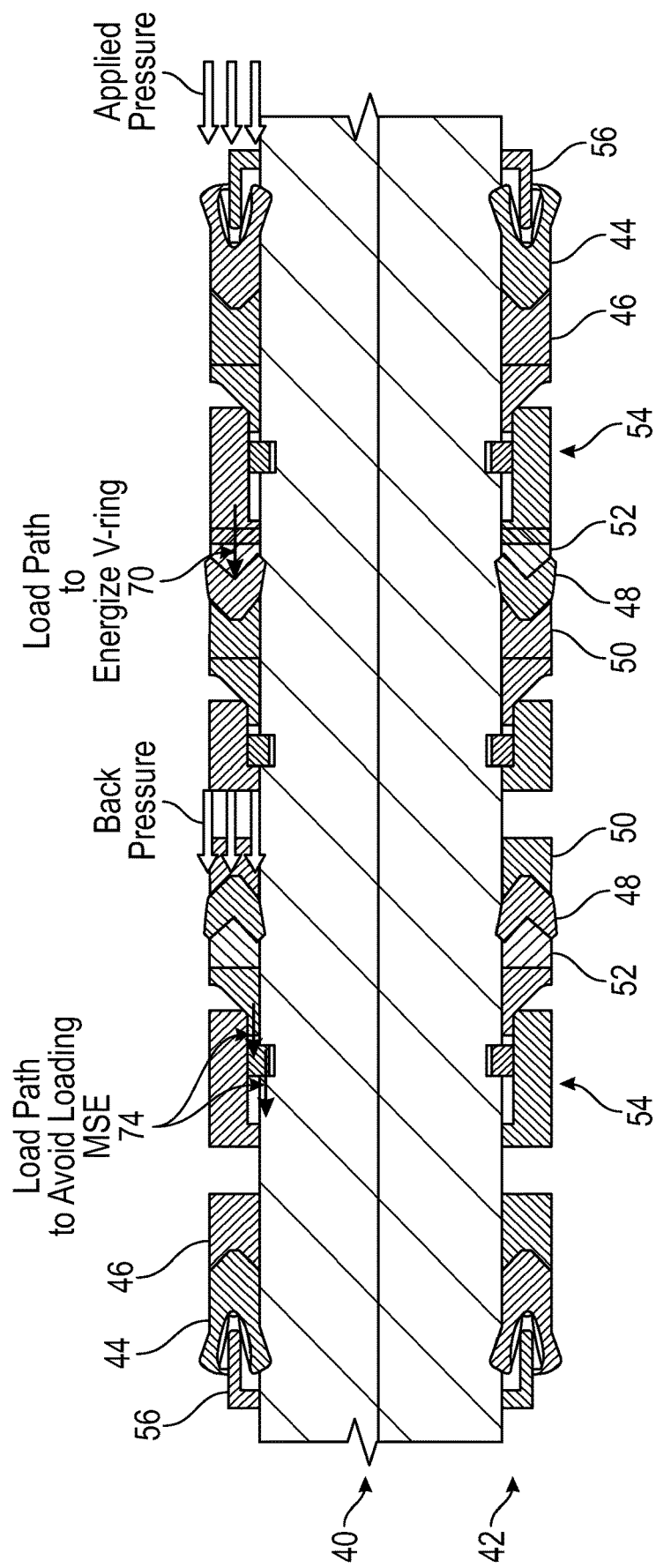
FIG. 5 is a cross-sectional illustration of another example of the safety valve seal assembly mounted about a safety valve piston, according to an embodiment of the disclosure.
Figure 6:
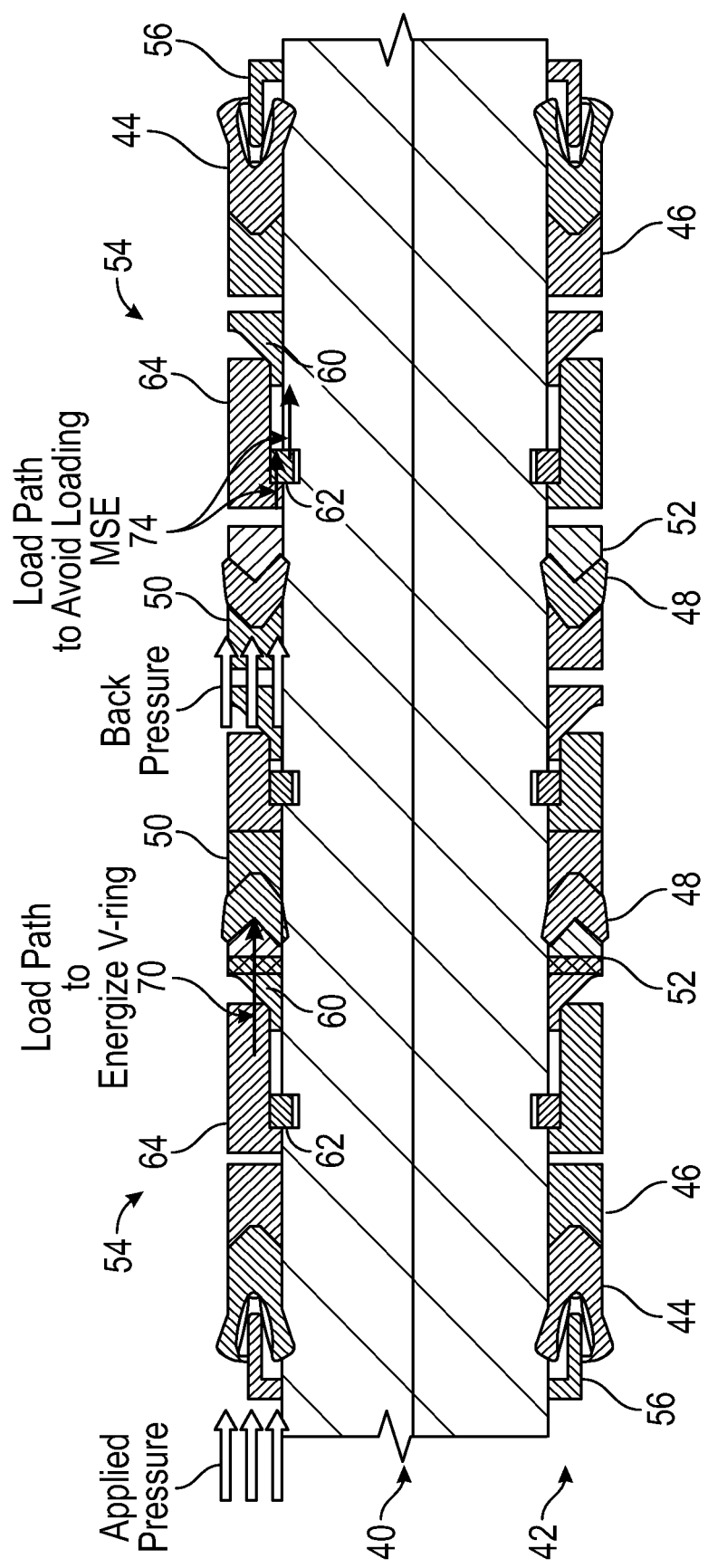
FIG. 6 is a cross-sectional illustration similar to that of FIG. 5 but in a different operational position, according to an embodiment of the disclosure.

As further illustrated in FIGS. 5 and 6, the safety valve piston seal assembly 42 may comprise a plurality of assemblies 42. In these examples, the seal assembly utilizes a pair of the seal assemblies 42 arranged in opposite directions along safety valve piston 40 to provide a dual pressure seal configuration. In this configuration, the seal assemblies 42 provide a bidirectional pressure seal system which protects against back pressure in both directions by providing load paths routed to the safety valve piston 40.

Figure 7:
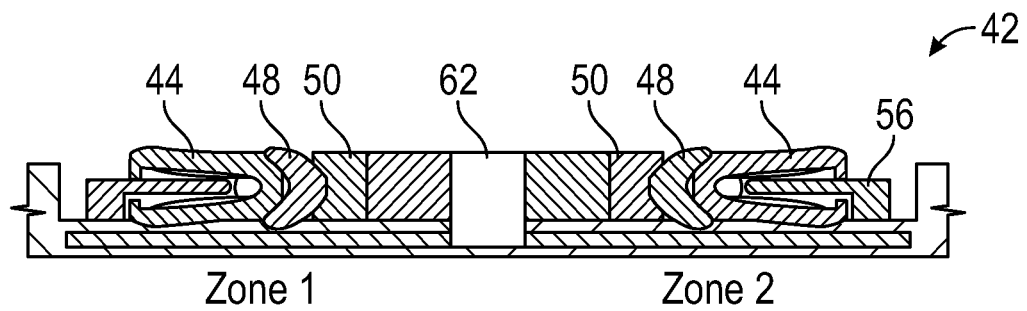
FIG. 7 is another cross-sectional illustration of an example of the safety valve seal assembly mounted about a safety valve piston, according to an embodiment of the disclosure.

FIGS. 7-10 provide additional examples of seal assembly arrangements which utilize single or plural load transfer assemblies 54 arranged to protect MSE seals 44 from pressures, e.g. back pressures, which may be established along various regions or zones of the safety valve piston. Specifically, FIG. 7 shows a seal assembly 42 including a load ring 62 that separates the seal assembly 42 into two separate zones in a traditional seal stack configuration. As further shown, each of the two separate zones includes an MSE seal 44 coupled to at least one V-ring 48. Because the MSE seal 44 is coupled to the at least one V-ring 48, the MSE seal 44 directly loads the at least one V-ring 48 and may be used to mechanically energize the at least one V-ring 48 when pressure is applied to the MSE seal 44. Moreover, the at least one V-ring 48 may backload the MSE seal 44 in this traditional seal stack configuration. That is, the at least one V-ring 48 may hold back pressure and then transfer this force to the MSE seal 44. The at least one V-ring 48 may be an elastomeric seal, a non-elastomeric seal, may be replaced with a seal having a different shape, or may be another pressure-energized elastomeric seal, as previously described without departing from the scope of the present disclosure. The seal assembly 42 may include other components, such as backup rings 50, for example, as previously described. The arrangement shown in FIG. 7 may allow a load path resulting from the mechanically energized at least one V-ring to proceed toward an actuator, such as a hydraulically powered piston or other piston body, for example, via other components in the seal assembly 42 and the load ring 62 without imparting detrimental loading to the MSE seal 44. Because the at least one V-ring 48 and the MSE seal 44 are coupled to each other in a single zone, minimal space is required to achieve the seal stack configuration shown in FIG. 7.

Figure 8:
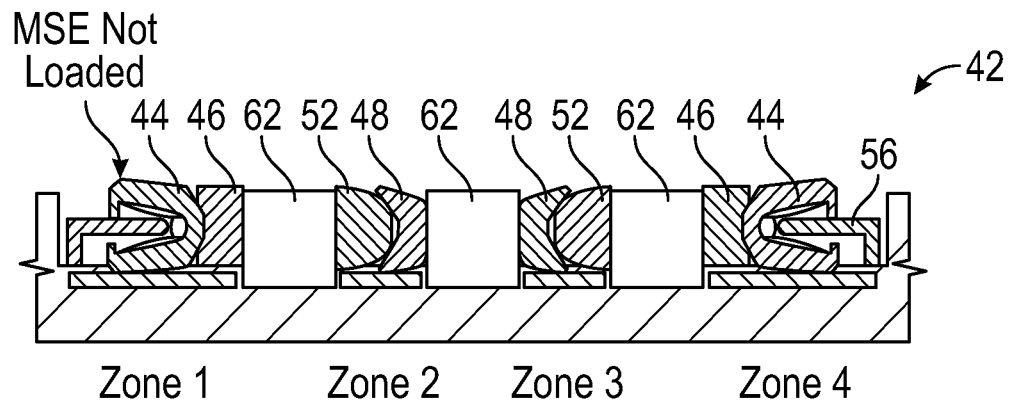
FIG. 8 is another cross-sectional illustration of an example of the safety valve seal assembly mounted about a safety valve piston, according to an embodiment of the disclosure.

Referring now to FIG. 8, a seal assembly 42 including three load rings 62 that separate the seal assembly 42 into four separate zones, creating a four-zone seal stack, is shown. In the seal assembly 42 according to one or more embodiments of the present disclosure, the MSE seal 44 may be decoupled from the at least one V-ring 48 by disposing each of these components in separate zones. By decoupling the MSE seal 44 from the at least one V-ring 48 in this way, the MSE seal 44 is not used to mechanically energize the open at least one V-ring 48. Instead, the at least one V-ring 48 requires pressure to be energized. Zones including the at least one V-ring 48 may include other components, such as an adapter 52 as previously described, for example. The at least one V-ring 48 may be an elastomeric seal, a non-elastomeric seal, may be replaced with a seal having a different shape, or may be another pressure-energized elastomeric seal, as previously described without departing from the scope of the present disclosure. Zones including the MSE seal 44 may include other components, such as an MSE backup ring 46 as previously described, for example. As shown in FIG. 8, V-rings 48 may be isolated from each other by being disposed in different zones according to one or more embodiments of the present disclosure. The arrangement shown in FIG. 8 may allow a load path resulting from the pressure energized at least one V-ring 48 in a given zone to proceed toward an actuator, such as a hydraulically powered piston or other piston body, for example, via other components in the seal assembly 42 and one or more load rings 62. Because the at least one V-ring 48 is in a separate zone from the MSE seal 44, the load path may proceed toward the actuator without imparting any loading to the MSE seal 44. That is, in a four-zone seal stack according to one or more embodiments of the present disclosure, the at least one V-ring 48 may be loaded by the MSE seal 44, but because the at least one V-ring 48 is separated from the MSE seal 44, the at least one V-ring 48 will not back load the MSE seal 44. Moreover, because the V-ring 48 ultimately transfers the load to the actuator, the V-ring 48 and other elastomeric components of the seal assembly 42 are not compromised and exhibit improved sealing.

Figure 9:
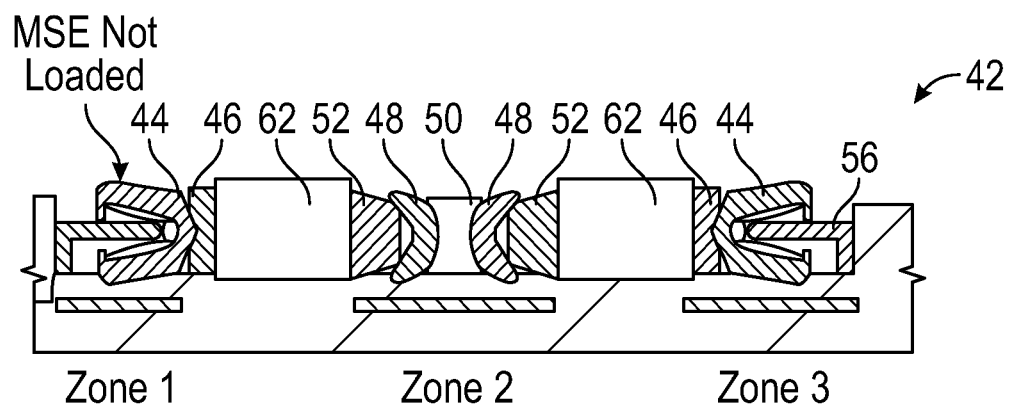
FIG. 9 is another cross-sectional illustration of an example of the safety valve seal assembly mounted about a safety valve piston, according to an embodiment of the disclosure.

Referring now to FIG. 9, a seal assembly 42 including two load rings 62 that separate the seal assembly 42 into three separate zones is shown. As shown, FIG. 9 is similar to FIG. 8 as previously described except the middle load ring 62 of FIG. 8 has been replaced with another component, such as a V-ring backup ring 50 shown in FIG. 9, for example, such that one of the zones includes two V-rings 48. In one or more embodiments of the present disclosure, the two V-rings 48 may be arranged in an X configuration, as shown in FIG. 9, for example. As shown, in the seal assembly 42 according to one or more embodiments of the present disclosure, the MSE seal 44 may be decoupled from the two V-rings 48 by disposing the MSE seal 44 and the two V-rings 48 in separate zones. By decoupling the MSE seal 44 from the two V-rings 48 in this way, the MSE seal 44 is not used to mechanically energize the two open V-rings 48. Instead, the two V-rings 48 require pressure to be energized. The zone including the two V-rings 48 may include other components, such as one or more adapters 52 and a V-ring backup ring 50 as previously described, for example. One or both of the two V-rings 48 may be an elastomeric seal, a non-elastomeric seal, may be replaced with a seal having a different shape, or may be another pressure-energized elastomeric seal, as previously described without departing from the scope of the present disclosure. Zones including the MSE seal 44 may include other components, such as an MSE backup ring 46 as previously described, for example. The arrangement shown in FIG. 9 may allow at least one load path resulting from the pressure energized V-rings 48 in a given zone to proceed toward an actuator, such as a hydraulically powered piston or other piston body, for example, via other components in the seal assembly 42 and one or more load rings 62. Because the two V-rings 48 are in a separate zone from the MSE seal 44, the at least one load path may proceed toward the actuator without imparting any loading to the MSE seal 44 in either zone. That is, in a three-zone seal stack according to one or more embodiments of the present disclosure, the two V-rings 48 may be loaded by the MSE seal 44, but because the two V-rings 48 are separated from the MSE seal 44, the two V-rings 48 will not back load the MSE seal 44. Moreover, because the V-rings 48 ultimately transfer the load to the actuator, the V-rings 48 and other elastomeric components of the seal assembly 42 are not compromised and exhibit improved sealing.

While FIGS. 7-9 show seal assemblies 42 having one, two, and three load rings 62 that separate two, three, and four zones, respectively, seal assemblies 42 according to one or more embodiments of the present disclosure may have different amounts of zones separated by load rings 62 without departing from the scope of the present disclosure.

Figure 10:
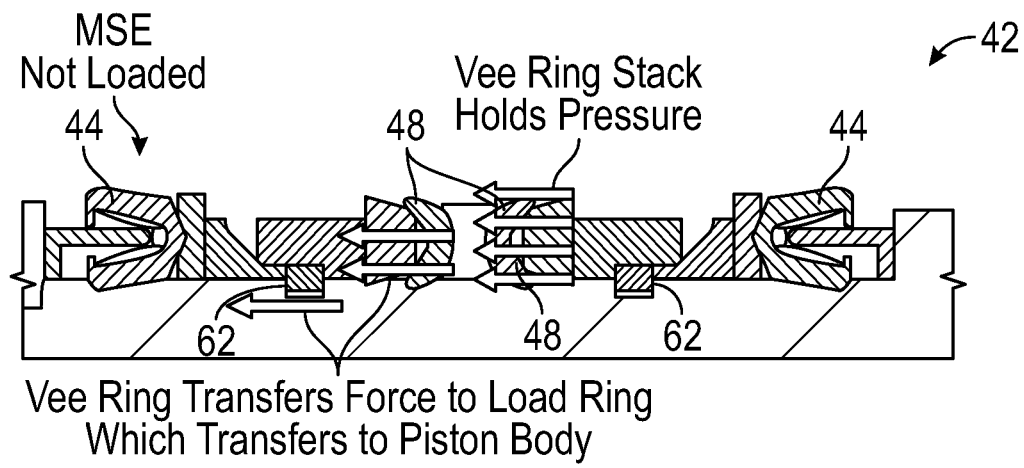
FIG. 10 is another cross-sectional illustration of an example of the safety valve seal assembly mounted about a safety valve piston, according to an embodiment of the disclosure.

Referring now to FIG. 10, benefits of separating the MSE seal 44 from the at least one V-ring 48 in a seal assembly 42, such as previously described with respect to the zone configurations of FIGS. 8 and 9 are shown. Because the V-ring 48 is pressure energized as previously described, the V-ring 48 is able to hold pressure and transfer force to the load ring 62, which transfers the force to an actuator, such as a hydraulically powered piston or other piston body, for example, without loading the MSE seal 44 or compromising the V-ring 48 or other elastomeric components of the seal assembly 42.

While one or more embodiments of the present disclosure generally relates to a methodology and system to facilitate improved sealing with respect to safety valve pistons so as to improve reliable safety valve operation, the methodology and system according to one or more embodiments of the present disclosure may also be applied to any downhole hydraulically operating completions equipment, such as flow control valves and formation isolation valves, for example. In such other embodiments, the system may more generally include a piston or other type of actuator, which may be hydraulically powered, and a sealing assembly, which may include various components and seals of different shapes and configurations that are either elastomeric or non-elastomeric.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system to facilitate operation of a safety valve, comprising:
   a safety valve piston; and
   a safety valve piston seal assembly disposed about the safety valve piston, the safety valve piston seal assembly comprising:
   a metal spring energized (MSE) seal;
   an MSE backup ring adjacent the MSE seal;
   at least one V-ring;
   a V-ring backup ring engaging the at least one V-ring;
   an adapter engaging the at least one V-ring on an opposite side from the V-ring backup ring; and
   a load transfer assembly disposed between the adapter and the MSE backup ring to reduce detrimental loading, which would otherwise occur along a load path through the MSE seal, by directing loading to the safety valve piston,
   wherein the load transfer assembly comprises a load ring engaged with the safety valve piston to transfer loading to the safety valve piston when the at least one V-ring is subjected to back pressure.

2. The system as recited in claim 1, wherein the load ring engages a shoulder of the safety valve piston.

3. The system as recited in claim 2, wherein the load transfer assembly further comprises a V-ring spacer having a portion disposed around the load ring.

4. The system as recited in claim 3, wherein the load transfer assembly further comprises an MSE spacer disposed between the V-ring spacer and the MSE backup ring.

5. The system as recited in claim 1, wherein the safety valve piston seal assembly further comprises a hat ring disposed between the MSE seal and an abutment of the safety valve piston.

6. The system as recited in claim 1, wherein the safety valve piston seal assembly comprises a plurality of safety valve piston seal assemblies arranged to provide a dual pressure seal configuration.

7. A system comprising:
   an actuator; and
   a seal assembly disposed about the actuator, the seal assembly comprising:
   a metal spring energized (MSE) seal;
   at least one sealing element; and
   a plurality of load rings dividing the seal assembly into a plurality of zones that separate the MSE seal from the at least one sealing element,
   the at least one sealing element configured to hold pressure and transfer a load to at least one load ring of the plurality of load rings, the at least one load ring of the plurality of load rings being configured to transfer the load to the actuator without loading the MSE seal when the at least one sealing element is subjected to back pressure.

8. The system of claim 7, wherein the actuator is a piston body.

9. The system of claim 7, wherein the at least one sealing element is a pressure energized elastomeric seal.

10. The system of claim 7, wherein the at least one sealing element is a non-elastomeric seal.

11. The system of claim 7, wherein the at least one sealing element is a V-ring.

12. The system of claim 7, wherein the at least one sealing element is a T seal.

13. The system of claim 7, wherein the load ring engages a shoulder of the actuator.

14. The system of claim 7, wherein the seal assembly comprises a plurality of seal assemblies arranged to provide a dual pressure seal configuration.

15. The system of claim 7, further comprising: an adapter engaging the at least one sealing element on one side of the at least one sealing element.

16. The system of claim 15, the seal assembly further comprising an MSE backup ring adjacent the MSE seal,
   wherein the MSE seal and the MSE backup ring are in a same zone of the plurality of zones, and
   wherein the at least one load ring of the plurality of load rings is disposed between the MSE backup ring and the adapter.

17. The system of claim 16, the seal assembly further comprising a second backup ring engaging the at least one sealing element on an opposite side of the at least one sealing element.

18. The system of claim 17, wherein at least one zone of the plurality of zones includes at least two sealing elements separated by the second backup ring.

* * * * *